Aug. 15, 1944.   A. E. GOODWIN   2,356,049
METHOD OF RESISTANCE WELDING
Filed June 19, 1942
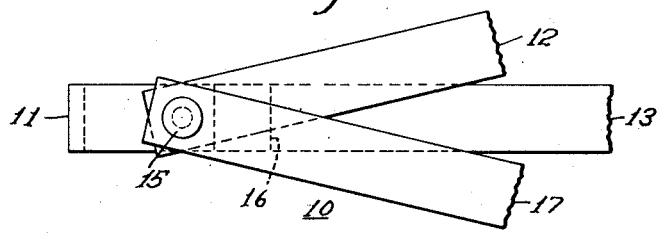
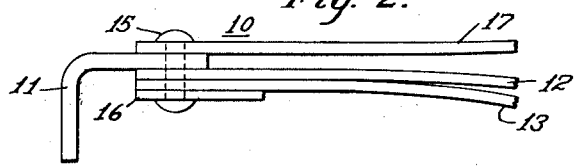
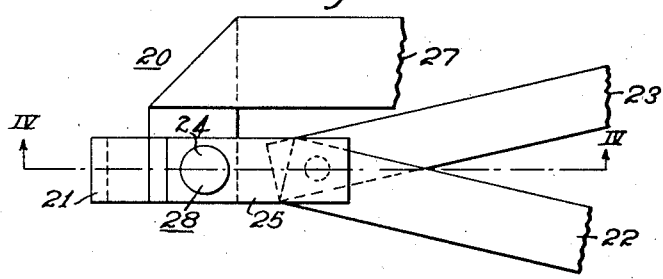
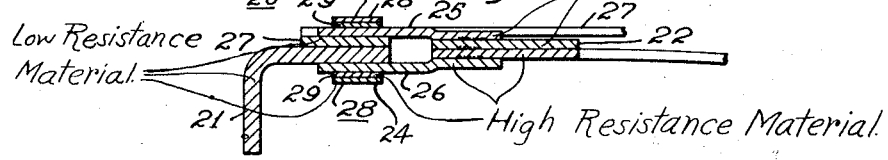
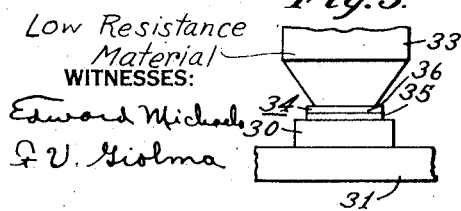
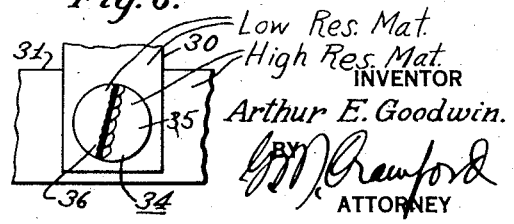
INVENTOR
Arthur E. Goodwin.

Patented Aug. 15, 1944

2,356,049

UNITED STATES PATENT OFFICE 2,356,049

METHOD OF RESISTANCE WELDING

Arthur E. Goodwin, Pittsburgh, Pa., assignor to Westinghouse Electric & Manufacturing Company, East Pittsburgh, Pa., a corporation of Pennsylvania Application June 19, 1942, Serial No. 447,686

6 Claims. (Cl. 219—10)

My invention relates generally to welding, and has reference in particular to a method of resistance welding.

Generally stated, it is an object of my invention to provide in a simple and inexpensive manner for improving the quality of resistance welds.

More specifically, it is an object of my invention to provide for producing resistance welding heat externally of a member to be resistance welded by interposing a bimetal pad between the member and an associated electrode.

Another object of my invention is to provide for producing welding heat externally of a member to be welded and preventing fusion of the welding electrode to the heat producing means.

It is also an object of my invention to utilize a bimetal pad interposed between a resistance welding electrode and a member to be welded, the pad having a relatively high resistance heat producing layer of metal adjacent the member to be welded and a relatively low resistance layer of metal adjacent the electrode.

It is an important object of my invention to utilize bimetal pads between parts to be resistance welded and the welding electrodes as a means of producing heat externally of the members.

Yet another object of my invention is to utilize a relatively high resistance heat producing material between a welding electrode and a member to be resistance welded and protect the electrode by means of an intermediate layer of a relatively low resistance material adjacent the electrode.

Other objects will in part be obvious, and will in part be described hereinafter.

In accordance with my invention a simple and inexpensive terminal structure may be provided wherein a relatively low resistance copper terminal member may be readily joined to a resistance element or other metallic part having a relatively high resistance by interposing a bimetal pad of copper and steel between the copper terminal member and the resistance welding electrode associated therewith. The pad is positioned with the copper side adjacent the electrode and the steel side adjacent the terminal member. Welding current is then passed through the electrode, pad, and terminal member, effecting fusion of the pad to the terminal member, and of the terminal member to the resistance element, without any sticking or fusing of the electrode.

For a more complete understanding of the nature and scope of my invention, reference may be had to the accompanying drawing, in which:

Figure 1 is a plan view of a prior form of terminal construction,

Fig. 2 is a side elevational view of the terminal construction shown in Fig. 1,

Fig. 3 is a plan view of a terminal construction structure made by practicing the method of, and embodying the principal features of the invention, Fig. 4 is a sectional view taken along the line IV—IV of Fig. 3, Fig. 5 is an enlarged elevational view of a modified terminal construction made by the method of, and embodying the invention, and Fig. 6 is an enlarged plan view of the terminal construction shown in Fig. 5.

Referring to Figs. 1 and 2, the reference numeral 10 may denote generally a terminal construction of the prior art, wherein a copper terminal member 11 is secured to adjacent end portions 12 and 13 of resistance elements in order to provide an electrical connection thereto. According to the previous method of making terminal connections, the terminal 11 was riveted to the ends of the elements by means of a rivet 15 passing through the terminal member and the ends of the elements. A steel reinforcing mat 16 was provided adjacent the ends of the elements to protect them from damage by the riveting operation, and in some instances a copper lead 17 was provided on the other side of the terminal member for making an additional connection thereto. Such construction generally proved unsatisfactory since the rivet soon loosened due to continued expansions and contractions of the end positions of the elements.

Referring to Figs. 3 and 4, the reference numeral 20 may denote generally a terminal construction embodying the principal features of the invention, whereby a relatively low resistance terminal member 21 of copper or a copper base alloy may be efficiently connected to the adjacent ends 22 and 23 of resistance elements of a relatively high resistance material, such as chromium aluminum iron, nickel chromium steel or other suitable resistance materials, which may under different conditions be of different thicknesses.

For the purpose of readily accommodating different thicknesses of resistance elements with a single terminal construction, means such as the connectors 25 and 26 may be positioned on opposite sides of one leg of the terminal member, so as to project therefrom in spaced and opposed relation. The connectors may comprise a relatively high resistance ferrous material such as steel, stainless steel or any of the other relatively high resistance ferrous alloys. If additional connections to the resistance elements are desired, means such as the terminal lead 27 may be provided, which may be interposed between one of the connectors and the terminal member.

In order to resistance weld the connectors 25 and 26 to the terminal member 21 without having the welding electrodes fuse or stick, and still produce the welding heat efficiently, means such as the bimetal pads 28 may be interposed between the welding electrodes and the connectors. Preferably the bimetal pads comprise a layer of a relatively high resistance material 29 such as steel, stainless steel, iron or the like, positioned adjacent the connectors and a layer of a relatively low resistance material 24, such as a copper base alloy or silver bonded or fused thereto on the side adjacent the electrode.

A bimetal pad may be used to assist in the welding operation with almost any type of welding electrode, since it produces additional heat by reason of the welding current traversing the relatively high resistance layer of ferrous material thereof. The principal benefits, however, are obtained where a copper or copper base alloy electrode is used, which would, in the absence of the bimetal pad, be inclined to fuse and stick to the member it engages.

By passing welding curent through the electrode, bimetal pad, connectors and the terminal member sufficient welding heat may be developed externally of the terminal member to effect a good weld thereof with the connectors, without the electrodes fusing or sticking. The projecting ends of the connectors may then be resistance welded in the usual manner to the ends of the resistance elements, different thicknesses of elements being readily accommodated by bending the projecting ends of the connectors towards or away from each other as necessary.

Referring to Figs. 5 and 6, it will be seen that the invention may be put to good use under conditions such as exist when a member 30 of relatively low electrical resistance is to be connected by resistance welding to a member 31 of relatively high electrical resistance. The member 30 may, for example, comprise copper, silver, a copper base alloy, aluminum or the like, while the member 31 may comprise iron, steel, stainless steel or, in general, any one of the relatively high resistance ferrous alloys.

In order to produce sufficient heat to effect a weld between the members 30 and 31, both the low electrical resistance of the member 30 and its relatively high conductivity must be taken into account. If an attempt is made to weld the members 30 and 31 directly, by passing welding current therethrough, very poor results will be secured since practically all of the heat is produced in the member 31. If an intermediate layer of a relatively high resistance material alone is interposed between the electrode 33 and the relatively low resistance material 30, sufficient heat may be produced to secure a weld between the members 30 and 31, but fusion of the welding electrode 33 to the interposed member will generally result, since as much heat is produced between the electrode and the interposed layer of resistance material as is produced between said layer and the relatively low resistance material 30. This is particularly so where the welding electrode 33 comprises copper or a copper base alloy as is generally the case.

By interposing between the electrode 33 and the relatively low resistance member 30 a bimetal pad 34, or the like I have found that highly satisfactory welds may be easily secured between low resistance and high resistance members. Preferably the side 35 of the pad 34 adjacent the low resistance member comprises a relatively high resistance material, such as, for example, iron, steel, stainless steel or the like. The other side 36 of the pad 34 may comprise a layer of a relatively low resistance material such as copper, silver or a suitable copper base alloy. Sufficient heat is produced in the high resistance layer 35 of the bimetal to effect satisfactory welding of the member 30 to the member 31 when a welding current is passed therethrough, while the relatively low resistance copper layer 36 of the bimetal prevents any sticking or fusing of the electrode.

Bimetal pads may also be used to advantage whenever resistance welding members having relatively low contact resistance and relatively high heat conductivity, such as for example, aluminum. In such case it is usually desirable to produce the welding heat externally, and this may be done effectively by using a copper steel bimetal pad with the copper side adjacent the electrode to prevent sticking of the electrode.

From the above description and the accompanying drawing, it will be apparent that I have provided a simple and inexpensive manner for securing improved resistance welds, particularly where the welds are to be made between materials having relatively wide differences in resistance. The invention, however, is not limited to these conditions since it may be desirable to produce external heat in resistance welding members of relatively low resistance materials which do not differ widely in their resistances, such, as for example, in welding copper to copper, aluminum to aluminum and other such combinations. By utilizing a bimetal pad in the manner described hereinbefore sufficient external heat may be applied to the members for resistance welding than without causing the welding electrodes to be fused thereto.

Since certain changes may be made in the above description and different embodiments of the invention may be made without departing from the spirit and scope thereof, it is intended that all the matter contained in the above description and shown in the accompanying drawing shall be considered as illustrative and not in a limiting sense.

I claim as my invention:

1. The method of resistance welding a copper base member to a ferrous member which comprises, positioning a bimetal pad on the ferrous member, said bimetal pad comprising a layer of steel adjacent the ferrous member and a layer of copper on the other side, and passing an electric current through the pad and the members to be welded by means of a copper base electrode engaging the copper side of the pad.

2. A method of resistance welding a copper base member to a ferrous member by applying pressure thereto by means of relatively low resistance copper base alloy electrodes and passing a welding current therethrough which comprises, placing a bimetal pad between the ferrous member and the electrode associated therewith, said bimetal pad comprising a relatively high resistance metal layer on the side adjacent the ferrous member and a relatively low resistance metal adjacent the electrode.

3. The method of resistance welding a relatively low resistance non-ferrous member to a relatively high resistance ferrous member which comprises positioning a bimetal pad on the relatively high resistance ferrous member, said bimetal pad comprising a layer of steel on the side adjacent said ferrous member and a relatively low resistance non-ferrous layer on the other side, applying pressure to the pad by means of a copper alloy electrode engaging the non-ferrous layer of the bimetal pad, and passing a welding current through the electrode, pad and said members.

4. A method of using relatively low resistance copper alloy electrodes for welding together ferrous and non-ferrous metal members of relatively widely different electrical conductivity which comprises the steps of positioning the members in overlapping relation, placing a bimetal pad on the ferrous member, said bimetal pad comprising a layer of a relatively low conductivity metal adjacent said member and a layer of a relatively high conductivity on the other side, applying pressure to the high conductivity side of the pad by means of a copper base electrode, and passing a welding current through the electrode, pad and members to be welded.

5. The method of resistance welding a ferrous member to a non-ferrous member with copper base alloy electrodes which comprises, positioning a bimetal pad between one of the electrodes and the non-ferrous member with a layer of steel on the side adjacent said member and a layer of silver bonded to the steel on the other side, applying pressure to the bimetal pad and the non-ferrous member through the said one electrode, and passing a welding current through the electrode, pad and the ferrous and non-ferrous members.

6. A method of resistance welding together a pair of metallic members of relatively high and relatively low conductivity, respectively, with a copper alloy electrode which comprises, interposing a separate bimetal pad between one of the members and the electrode associated therewith at the zone where a weld is to be made, and passing a welding current through the electrode, pad and members, said bimetal pad comprising a layer of a relatively low resistance metal adjacent the electrode and a layer of a relatively high resistance material adjacent the said one member.

ARTHUR E. GOODWIN.